(12) United States Patent
Corhodzic

(10) Patent No.: US 11,031,706 B1
(45) Date of Patent: Jun. 8, 2021

(54) HIGH VOLTAGE SUPERCONDUCTORS FOR DATACENTER CAMPUS

(71) Applicant: Google LLC, Mountain View, CA (US)

(72) Inventor: Selver Corhodzic, Campbell, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/923,858

(22) Filed: Jul. 8, 2020

(51) Int. Cl.
*H01B 12/00* (2006.01)
*H01R 4/68* (2006.01)
*H01B 12/02* (2006.01)

(52) U.S. Cl.
CPC .............. *H01R 4/68* (2013.01); *H01B 12/02* (2013.01)

(58) Field of Classification Search
CPC ............................. H01B 1/00–12; H01R 4/68
See application file for complete search history.

(56) References Cited

FOREIGN PATENT DOCUMENTS

| JP | 5972156 B2 | 8/2016 |
| KR | 100744411 B1 | 7/2007 |
| KR | 20180006118 A | 1/2018 |

*Primary Examiner* — Jeremy C Norris
(74) *Attorney, Agent, or Firm* — Lerner, David, Littenberg, Krumholz & Mentlik, LLP

(57) ABSTRACT

A system for powering a datacenter campus including a first main direct current (DC) superconductor cable configured to receive direct current DC electrical power from a first alternating current (AC) power grid through a first AC-DC converter, a second main DC superconductor cable configured to receive DC electrical power from a second AC power grid through a second AC-DC converter, a DC-DC hub connected to the first and second main superconductor cables, and a plurality of secondary DC superconductor cables, wherein each secondary DC superconductor cable includes a first end electrically connected to the DC-DC hub and a second end electrically connected to server racks housed in a respective datacenter building of the datacenter campus.

20 Claims, 1 Drawing Sheet

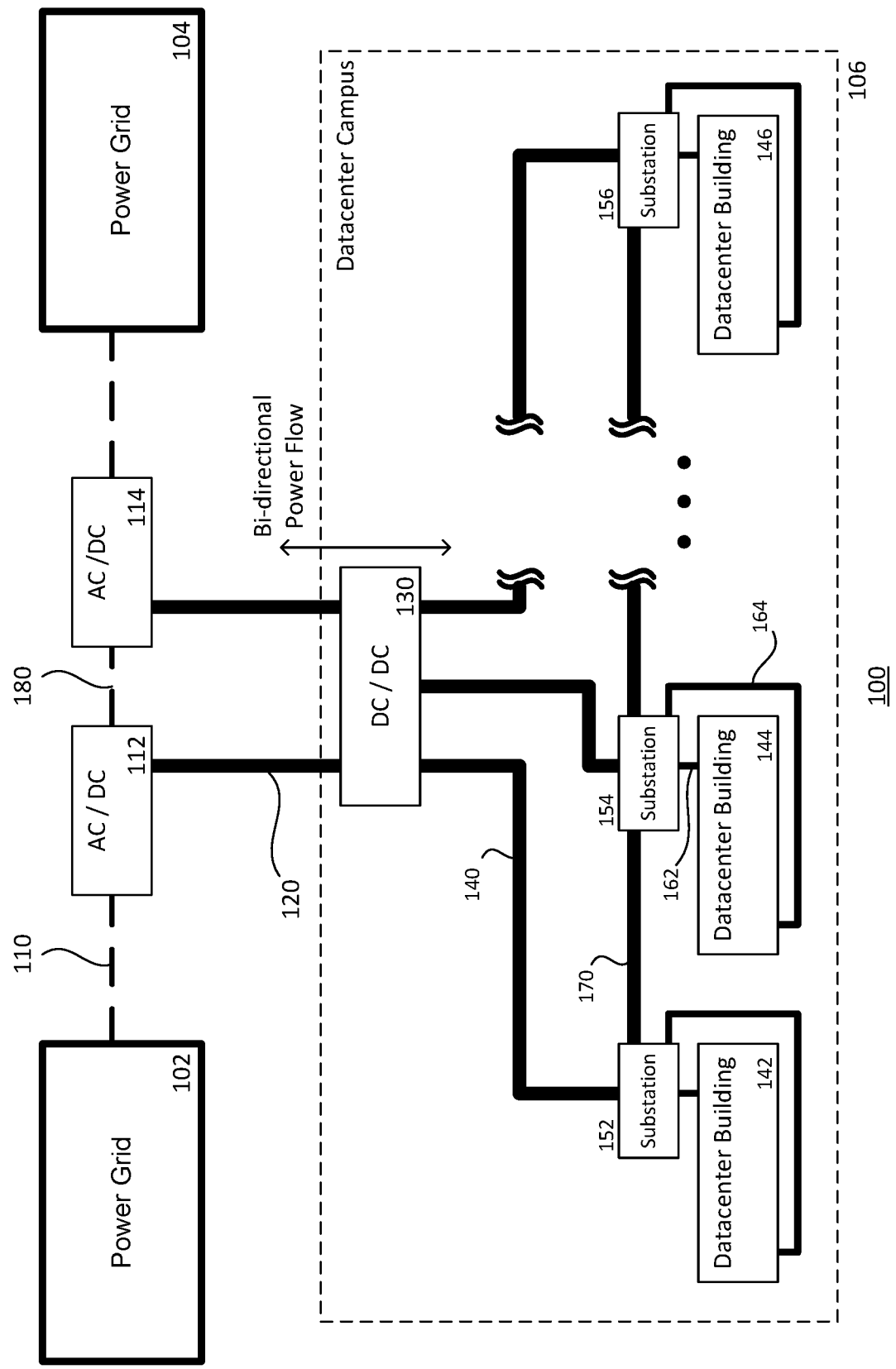

HIGH VOLTAGE SUPERCONDUCTORS FOR DATACENTER CAMPUS

BACKGROUND

High voltage applications, such as operating a large-scale datacenter, require high-voltage power to be provided from a high-voltage power source, such as a transmission grid. High-voltage power lines are typically used to connect the transmission grid to the datacenter.

Conventional high-voltage power lines have several disadvantages. High-voltage power lines require heavy and large conductive elements in order to carry power to the datacenter or other downstream loads. Additionally, in many places, the high-voltage power lines are conventionally routed above ground using overhead conductors. Placing the conductors above ground uses up valuable space, makes connection to underground datacenter buildings difficult, and increases the risk of electrical failure, such as due to storms or falling trees. Additionally, the sight of high-voltage power lines is generally unappealing, and some are concerned about radiation risks from exposure to the power lines.

In a datacenter campus, in which the datacenter is distributed among several buildings in a confined space, additional high-voltage power lines, branching elements, and switching elements, are needed to connect the transmission grid to each building. These elements all require large and heavy conductors that occupy significant amounts of space, despite the confined space available within the campus. Additionally, the size and weight of the power lines and conductors makes updating campus layout especially difficult if changes are desired to be made, such as adding a new building. Furthermore, running power lines to each of the buildings only increases unsightliness of the power distribution system and heightens exposure concerns.

Additionally, using high-voltage power lines to provide power to datacenters raises concerns over grid stability. Grid stability may be problematic at any time, but particularly when the datacenter load suddenly changes, and especially when the data center is connected to a weak transmission grid.

BRIEF SUMMARY

The technology of the present disclosure relates generally to using superconductor cables to transfer power both to and from a transmission grid that is connected to a large scale datacenter.

One aspect of the present disclosure is directed to a system for powering a datacenter campus, including a first main direct current (DC) superconductor cable configured to receive direct current DC electrical power from a first alternating current (AC) power grid through a first AC-DC converter, a second main DC superconductor cable configured to receive DC electrical power from a second AC power grid through a second AC-DC converter, a DC-DC hub connected to the first and second main superconductor cables, and a plurality of secondary DC superconductor cables, wherein each secondary DC superconductor cable includes a first end electrically connected to the DC-DC hub and a second end electrically connected to server racks housed in a respective datacenter building of the datacenter campus.

In some examples, the system may further include a plurality of reactive power sources installed in the respective datacenter buildings of the datacenter campus, wherein the DC-DC hub is configured to receive reactive power from the plurality of reactive power sources and provide the reactive power to the first and second AC power grids. The plurality of reactive power sources may include a plurality of power supply units included in servers and computers of the server racks of the respective datacenter buildings of the datacenter campus. The plurality of reactive power sources may be configured to supply between 500 to 1500 VA of power to the first and second power grids through the DC-DC hub.

In some examples, the system may further include a plurality of DC-DC converters. Each DC-DC converter may be associated with a respective datacenter building of the datacenter campus. The second end of each secondary DC superconductor cable may be electrically connected to the server racks housed in a respective datacenter building of the datacenter campus through a respective secondary DC-DC converter of the respective datacenter building. The respective secondary DC-DC converter may be housed in a substation of the respective datacenter building.

In some examples, the system may further include a third DC superconductor cable having a first end connected to a secondary DC-DC converter of a first datacenter building of the datacenter campus and a second end connected to a secondary DC-DC converter of second datacenter building of the datacenter campus. The third DC superconductor cable may be configured to distribute power between substations of the first and second datacenter buildings.

In some examples, each secondary DC-DC converter may be configured to convert an incoming high voltage of about 100 kV or more to a medium voltage of between about 10-40 kV In some examples, at least one secondary DC superconductor cable may connect the main DC-DC converter to an underground datacenter building.

In some examples, at least one datacenter building may be connected to multiple secondary DC superconductor cables at different sides of the building.

In some examples, the datacenter campus may be a datacenter system configured to operate on between about 500 MVA and about 1,000 MVA.

In some examples, the system may further include a non-superconducting DC power line having a first end connected to the first AC-DC converter, and a second end connected to the second AC-DC converter, and configured to transfer power between the first AC power grid and the second AC power grid.

In some examples, each of the first and second AC-DC converters may be outside of the datacenter campus, and the DC-DC hub may be within the datacenter campus.

In some examples, at least one of the first and second main DC superconductor cables may be a high voltage superconductor cable, and wherein at least one of the plurality of secondary DC superconductor cables may be a medium voltage superconductor cable.

In some examples, at least one the first and second main DC superconductor cables may be a multicore superconductor cable, and at least one of the plurality of secondary DC superconductor cables may be a single core superconductor cable.

In some examples, the secondary DC superconductor cables may have a diameter between 3"-6", and the main DC superconductor cables may have a diameter about twice to three times the size of the secondary DC superconductor cables.

Another aspect of the disclosure is directed to a datacenter campus including a plurality of buildings, each building housing a plurality of server racks on one or more floors of the building, a DC-DC hub connected to a first AC power grid via a first main DC superconductor cable and a first AC-DC converter, and to a second AC power grid via a second main DC superconductor cable and a second AC-DC converter, and a plurality of secondary DC superconductor cables, wherein each secondary DC superconductor cable includes a first end electrically connected to the DC-DC hub and a second end electrically connected to the server racks of a respective datacenter building of the plurality of buildings.

In some examples, the datacenter campus may further include a plurality of substations, each substation associated with a corresponding building and housing a respective secondary DC-DC converter configured to receive electrical power at a first voltage from a respective secondary DC superconductor cable, reduce the received power from the first voltage to a second voltage, and transmit the received power at the second voltage to the server racks of the corresponding building via a respective third DC superconductor cable.

In some examples, the datacenter campus may further include a plurality of power supply units included in servers and computers of the server racks of the respective datacenter buildings, wherein the plurality of power supply units are configured to provide reactive power to first and second AC power grids through the DC-DC hub, and wherein the plurality of power supply units are configured to supply between 500 to 1500 VA of power to the first and second power grids through the DC-DC hub.

BRIEF DESCRIPTION OF THE DRAWINGS

FIG. 1 is a schematic diagram of a system according to aspects of the present disclosure.

DETAILED DESCRIPTION

Overview

Superconductor cables are relatively small and lightweight compared to conventional high-voltage power lines, while still being capable of providing sufficient high-voltage power to operate a large scale application, such as a datacenter campus. The present disclosure provides a topology using superconductor cables to transfer power from a power grid to a large scale datacenter to efficiently provide power to server racks at the datacenter, as well as from the large scale data center to the power grid to address grid stability. In the proposed topology, the superconductor cables are electrically decoupled from the transmission grid. For example, the superconductor cables may be configured to carry direct current (DC) power from the transmission grid to the datacenter campus, and an AC-DC converter may be used to connect the DC superconductor cable to the alternating current (AC) transmission grid. The DC superconductor cables may be connected to buildings of the datacenter campus through a series of DC-DC superconducting links, shown more generally herein as a hub. The AC-DC converter and DC-DC hub may include one or more transformers that electrically decouple the AC power source from the DC power distribution system. Thus, sudden load changes at the datacenter campus may be avoided from affecting the upstream transmission grid.

Furthermore, the proposed topology for using superconducting cables can provide increased stability to the upstream transmission grid. For example, the hub may be configured to receive reactive power from substations of the datacenter campus. The reactive power may then be fed back from the hub to the transmission grid. This may further improve stability of the transmission grid. Additionally, the reactive power provided upstream may be sold to the transmission grid, thereby reducing operating costs for the datacenter campus.

The proposed topology can also be used to connect a datacenter campus to multiple transmission grids. For example, the DC-DC hub may include multiple DC superconductor cables that extend to respective AC-DC converters, and each AC-DC converter may be connected to a different respective AC transmission grid. The transmission grids may further be linked to one another through a DC cable extending between the respective AC-DC converters. Altogether, the AC-DC topology using DC cable links to link together transmission grids may maintain the electrical decoupling between the datacenter campus and the transmission grids while also providing increased stability between the multiple connected grids.

Even over relatively long lengths, superconductor cables exhibit low or even virtually negligible electrical losses, and have relatively high reliability as compared to high-voltage power lines. Because the superconductor cables have relatively low or negligible power loss, they do not require the large and heavy conductor elements that are required by the high-voltage power lines. As such, the superconductor cables occupy a much smaller amount of area, are less unsightly, and do not raise the concerns about radiation exposure normally associated with large transmission lines. Furthermore, the reduced size and weight of the cables makes it easier to route the cables from above ground to underground locations, such as an underground substation or datacenter building.

The reduced size and weight of superconductor cables compared to high-voltage power lines further contributes to the adaptability of power distribution schemes between power sources and buildings of the datacenter. For example, each datacenter building of the campus may be equipped with a high voltage substation used to convert the high voltage power received from the transmission grid to a medium voltage power for distribution to the server racks of the datacenter. While space constraints may not allow for high-voltage power cable to interconnect the individual substations to one another, the use of super conductor cables makes interconnection much easier and straightforward. Interconnecting the substations using superconductor cables may permit for sharing and transferring power between buildings of the datacenter campus. Sharing power may further increase power efficiency of the datacenter campus, beyond the added efficiency of the low to virtually negligible losses of the superconducting cables.

The reduced size and weight of the superconductor cables may also make it easier to connect one or more power sources to different sides of a datacenter building. High-voltage power lines are restrictively large and heavy, and it would be undesirable to surround a building with high-voltage power lines in order to provide power from multiple sides. By contrast, superconductor cables do not occupy a large amount of space, and can be buried underground to avoid occupying any space. Thus, surrounding a building with superconducting cables in order to provide power from multiple or all sides of the building does not interfere with either function or aesthetic of the building. Connecting a datacenter building to power from more than one side can result in additional benefits, such as avoiding unidirectional current density within the datacenter. Unidirectional current density can result in underutilization of power bus components, as well as require additional power balancing equipment. By contrast, a datacenter building connected from opposite sides does not have "upstream" or "downstream" components and thus has a more uniform current density, which in turn can lead to more efficient utilization of supplied power and avoiding the need for power balancing equipment.

Example System

FIG. 1 illustrates an example system 100 for powering a datacenter campus. In the example of FIG. 1, each of a first power grid 102 and a second power grid 104 is connected to a datacenter campus 106. Each power grid may be a network of power stations. In some examples, the power stations may make up a strong grid, capable of carrying large amounts of power without experiencing fluctuations due to variations in the load connected to the grid. In other examples, the power stations may make up a weak grid, which may be subject to fluctuations due to variations in the load connected to the grid. The datacenter campus may operate server racks at a large scale, and may require between 500-1,000 MVA of power from the connected power grids 102, 104.

Each power grid may distribute power via power distribution elements such as three phase alternating current (AC) power lines 110. The power grids may further be connected to one another by the three phase alternating current (AC) power lines. The datacenter campus may operate on direct current (DC) power, and may be connected to DC power distribution elements in order to receive the DC power. In the example of FIG. 1, a first AC to DC converter 112 is provided for interfacing the first power grid 102 and a second AC to DC converter for interfacing the second power grid with the DC power distribution elements connected to the datacenter campus. In the example of FIG. 1, each of the power grids is connected to a separate AC to DC converter, although in other examples, power grids may be linked to one another and may share AC-to-DC converters.

The AC-to-DC converters 112, 114 may include one or more transformers for converting AC power to DC power or vice versa. The transformers may provide the added benefit of electrically decoupling the power grids 102, 104 from the components of the datacenter campus 106, such that sudden load changes at the datacenter campus, for instance due to shifts or changes in power demand or server operability, are not reflected towards the power grids. Without decoupling the power grids from the datacenter campus, the sudden load changes could cause overloading or underloading of the high-voltage lines and related power distribution components, which in turn could damage the grid. These risks are increased when the datacenter campus is connected to a relatively weak transmission grid.

The DC power distribution elements may be superconductor cables 120 configured to carry high voltage direct current (DC) electricity. Superconductor cables typically include one or more core superconducting elements or superconductors and an insulation surrounding the core superconductors. The insulation may provide both electrical instruction and temperature insulation, such that an interior of the superconductor cable may be maintained and operate at very low temperatures while an exterior of the cable is exposed to much higher temperatures, such as room temperature. Due to low resistance of the superconducting cables, voltage drop across the superconducting cables may be very low or virtually negligible. The voltage at a given point of the superconducting cables may be between about 100 kV-1,000 kV, and more typically between about 100 kV-500 kV, and the high voltage DC current may be between about 10 kA-20 kA.

Each superconductor cable may include a first end connected to a respective AC-to-DC converter 112, 114 of the system 100, and a second end connected to a hub for linking the power grids 102, 104 to the datacenter campus 106. In the example of FIG. 1, a single DC-to-DC hub 130 is shown, although in other examples, multiple hubs or a network of linking elements may be provided for linking together multiple power grids and the datacenter campus.

The DC-to-DC hub 130 may be configured to combine electrical power received from the multiple power grids 102, 104. Additionally or alternatively, the DC-to-DC hub 130 may be configured to split electrical power received from the multiple power grids 102, 104 among several secondary superconductor cables 140 in order to provide power to the several buildings 142, 144, 146 of the datacenter campus. Each building 142, 144, 146 may be connected to a respective secondary superconductor cable 104, such that each secondary superconductor cable 140 may include a first end connected to the DC-to-DC hub 130 and a second end connected to a respective datacenter building 142, 144, 146. In some instances, electrical current levels in the secondary superconductor cables may be higher than in the main superconductor cables, such as if the secondary superconductor cables are connected to DC-to-DC hubs that combine power from multiple power sources. Alternatively, electrical current levels in the secondary superconductor cables may be lower than in the main superconductor cables, such as if the secondary superconductor cables are connected to DC-to-DC hubs that split power from multiple power sources.

Additionally or alternatively, the DC-to-DC hub 130 may be provided to change a voltage level of the power provided from the power grids. For instance, the hub 130 may include a step-up or step-down type converter to raise or lower a voltage of the received power.

In the example of FIG. 1, the main superconductor cables 120 extend within the perimeter of the datacenter campus 106, the DC-to-DC hub 130 is positioned within the datacenter campus 106, and the secondary superconductor cables 140 are positioned fully within the datacenter campus 106. This allows power from the power grids 102, 104 to be delivered to datacenter campus 106 without the effort of having to extend the transmission grid, and without significant losses due to electrical cables delivering the power from the grids over a distance to the datacenter campus 106. In other examples, the DC-to-DC hub 130 may be positioned outside of a perimeter of the datacenter campus 106, whereby the main superconductor cables 120 may be positioned fully outside the datacenter campus 106 and the secondary superconductor cables 140 may extend across a perimeter of the datacenter campus 106 to provide power from the DC-to-DC hub 130 to the datacenter buildings 142, 144, 146. This may require additional length of superconducting cable to be provided, but may be advantageous in situations such a noncontiguous datacenter campus, or such as a campus having a suitable DC-to-DC hub location outside a perimeter of the campus.

The secondary superconductor cables 140 may be connected to the respective datacenter buildings directly or indirectly. In the example of FIG. 1, a second end of each secondary superconductor cable 140 is connected to a respective substation 152, 154, 156. Each datacenter building may include its own substation. Each substation may include components such as switchgear for controlling power provided to the corresponding datacenter building, transformers for converting a voltage level of the incoming DC power, uninterrupted power supplies (UPS) for accommodating breaks or fluctuations in power supply without affecting downstream equipment, and power distribution units (PDU) for distributing power from the substation. Control elements for power distribution may be automated, manually controlled, or a combination thereof.

In the example of FIG. 1, the secondary superconductor cables 140 may provide a high voltage having a voltage level roughly equal to that of the main superconductor cables 120. This may be possible due to the low or negligible resistance properties of the superconducting elements. Transformers may be included in the substations 152, 154, 156 for the purpose of stepping down voltage levels from the high voltage of the main and secondary superconductor cables to a medium voltage. Medium voltage levels may be between about 10 kV and 40 kV. The medium level voltage may then be provided to a power bus housed within the datacenter building 144 over one or more final stage superconducting cables 162, 164 that connect the substation 154 to the datacenter building 144.

The medium voltage superconductor cables may be smaller in diameter than the high voltage superconductor cables. For example, both the main and secondary high voltage superconductor cables may be multicore cables, and the medium voltage superconductor cables may be single core cables. In such an example, the high voltage superconductor cables may have a diameter about twice to three times that of the medium voltage superconducting cable. For instance, if a single core medium voltage superconducting cable is about 3" in diameter, providing three medium voltage superconducting cables next to one another may require a space about 15"-18" wide to accommodate a one diameter spacing between each cable. Combing the three cables into a single multicore high voltage superconducting cable may reduce required space by about 50-70%, thus requiring only about 5"-9", depending on design. For further example, a single core medium voltage superconducting cable having a diameter of about 6" would require a space of about 30"-36" for three adjacent cables, and about 12"-18" for a single multicore high voltage superconducting cable. The reduced size and weight of the medium voltage superconductor cables may further improve ease of connecting the substation if a given datacenter building to multipole sides of the datacenter building, if a given datacenter building is underground, or both. In the example of FIG. 1, a first medium voltage superconductor cable 162 is shown connecting a substation 154 to a first side of a datacenter building 144, and a second medium voltage superconductor cable 164 is shown connecting the substation 154 to an opposite second side of the same datacenter building. In the example of FIG. 1, the first and second sides of the building are opposite sides, although in other examples, the two sides may be adjacent sides, or non-opposing sides. Additionally, in other examples, more medium voltage superconductor cables may be provided to connect the substation to more sides of or more entry points into the datacenter building, such as to every side of the datacenter building 144. Because the superconductor cables do not occupy a large amount of space, and can even be buried underground to avoid occupying any space, circling the building with superconductor cables is not as intrusive or obstructive as extending conventional high voltage power lines onto the datacenter campus. Additionally, powering the building from multiple sides can provide for multidirectional current flow through the building. Multidirectional current flow avoids some server racks or power bus components of the building being "upstream" from other "downstream" server racks or power bus components. This can lead to more uniform current density within the building, and the power bus elements may be utilized more efficiently given the presence of uniform current density. Additionally, defects or outages on one side of the building do not necessarily lead to defects and outages on the other, downstream, side of the building, since neither side of the building can be characterized as upstream or downstream. Additionally, the uniform current density provided by the multiple sources of power into the building can avoid the need for expensive current balancing equipment.

Each datacenter building 142, 144, 146 may include a plurality of server racks. Each building may have one or more floors, and the server racks may be positioned on each floor of the building. The superconductor cables entering the building may enter from a ground level, and extend vertically through a column, wall or shaft of the building to connect to separate power bus elements on each floor. In some examples, the power bus elements of a given floor may also include a network of superconductor cables, whereby each superconductor cable may include tap connections and local DC bus ducts for supplying power to one or more of the server racks. Thus, power may be transported by superconductor cables all the way from the AC-to-DC power converters 112, 114 of the power grids 102, 104 to within feet of the individual server racks, thus significantly avoiding power loos due to resistive elements of more conventional transmission cables and wires.

In other examples, the datacenter building, associated substation, or both, may be positioned underground. Routing the superconducting cable to the understand building or substation is comparably easier than routing high-voltage power lines, due to the superconductor cable's relative size and presence of insulation—both electrical and thermal—all around the cable. Similar to the above-ground building, the superconductor cable may extend vertically through a column, wall or shaft of the underground building to connect to separate power bus elements on each floor of the underground building.

The substations may also include elements for controlling the distribution of electrical power between individual buildings of the datacenter campus. For example, the system 100 of FIG. 1 includes high voltage connecting superconductor cables 170 connecting adjacent substations 152, 154, 156 to one another. The connecting superconductor cables 170 may have the same or similar properties as the secondary superconductor cables 140, and may be capable of transferring power between the datacenter buildings. Thus, if a higher power density is needed at one building, the high density power may be supplied from another building of the campus 106.

The above examples generally describe providing stable power from one or more power grids to a datacenter campus with high efficiency and low losses. However, in some examples, it may also be possible to provide power from the datacenter campus back to the power grids using reactive power generated at the datacenter campus. Each server rack, and the servers and computers of the server rack, at the datacenter campus is capable of generating a small amount of reactive power. These devices may be effectively used as power supply units configured to collect power from the power distribution system 100 and to supply the collected power as reactive power. Reactive power may be supplied in response to fluctuations in power levels in order to avoid significant fluctuations in power levels across the power distribution architecture. Across the thousands of power supply units included in the servers and computers of the datacenter campus, the total reactive power can reach significant sums, such as between about 500-1,500 VA. This power can be fed back to the power grid, which can help to stabilize the grid, such as during low power usage times for the grid. The DC-to-DC hub 130 and AC-to-DC converters may be designed to permit bidirectional flow of power, whereby the reactive power from the datacenter buildings and substations may be provided through the secondary superconductor cables 140 to the main superconductor cables 120 and further to the power grids 102, 104.

The above examples also generally describe the power grids 102 being connected to one another in order to provide additional power stability and protection against fluctuations in power load. In the example of FIG. 1, a standard power line 180 connects the two power grids 102, 104 to one another through the AC-to-DC converters 112, 114. The power line 180 may be either an AC line or DC line depending on the arrangement of the AC-to-DC converters. In other examples, the power grids may be directly connected to one another instead of through the converters. In yet further examples, the power grids may be separate from each other and connected only through the datacenter. The reactive power storage elements of the datacenter may still provide some stability to one power grid using power collected from a different power grid. Thus, the datacenter campus of the present disclosure can provide some amount of power stability between even electrically separated power grids according to the principles disclosed herein.

Additionally, the above examples generally describe the use of DC superconducting cables to provide power to the datacenter. Use of DC cables has some advantages, such as increased efficiency. However, it should be recognized that the same or similar principles may be applied to a power distribution network using superconductor cables to transport AC power between the power grids and datacenter campus. Transformers or other decoupling components may still be used in such an arrangement to avoid load changes at the datacenter from adversely affecting the power grids.

The use of superconductor cables, as in the example system 100 and alternative systems described herein, provides numerous benefits over the use of conventional high-voltage power lines. Superconductor cables are relatively small and lightweight compared to high-voltage power lines. Superconductor cables also provide energy with higher efficiency and fewer losses due, for instance, to reduce resistance in the cables. Superconductor cables also require less infrastructure than the high-voltage line counterparts, while also enabling power sharing between individual buildings and high voltage substations of the campus. The relative size of superconductor cables also makes power connections to underground buildings easier, and connections to multiple sides of a datacenter building feasible without obstructing the building or raising concern about exposure to high voltage transmission lines.

The example systems also permit for electrically decoupling the datacenter campus from the transmission grid, so that sudden load changes at the datacenter campus do not overload or underload the high-voltage power lines of the power grids. Despite the electrical decoupling between the campus and power grid, the power grid may still be stabilized by reactive power fed back from the thousands of devices operating at the campus. Thus, the campus not only protects the power grid from instability, but also increases stability.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for powering a datacenter campus, the system comprising:
   a first main direct current (DC) superconductor cable configured to receive direct current DC electrical power from a first alternating current (AC) power grid through a first AC-DC converter;
   a second main DC superconductor cable configured to receive DC electrical power from a second AC power grid through a second AC-DC converter;
   a DC-DC hub connected to the first and second main superconductor cables; and
   a plurality of secondary DC superconductor cables, wherein each secondary DC superconductor cable includes a first end electrically connected to the DC-DC hub and a second end electrically connected to server racks housed in a respective datacenter building of the datacenter campus.

2. The system of claim 1, further comprising a plurality of reactive power sources installed in the respective datacenter buildings of the datacenter campus, wherein the DC-DC hub is configured to receive reactive power from the plurality of reactive power sources and provide the reactive power to the first and second AC power grids.

3. The system of claim 2, wherein the plurality of reactive power sources comprises a plurality of power supply units included in servers and computers of the server racks of the respective datacenter buildings of the datacenter campus.

4. The system of claim 3, wherein the plurality of reactive power sources are configured to supply between 500 to 1500 VA of power to the first and second power grids through the DC-DC hub.

5. The system of claim 1, further comprising a plurality of secondary DC-DC converters, wherein each secondary DC-DC converter is associated with a respective datacenter building of the datacenter campus, and wherein the second end of each secondary DC superconductor cable is electrically connected to the server racks housed in a respective datacenter building of the datacenter campus through a respective secondary DC-DC converter of the respective datacenter building.

6. The system of claim 5, wherein the respective secondary DC-DC converter is housed in a substation of the respective datacenter building.

7. The system of claim 6, further comprising a third DC superconductor cable having a first end connected to a secondary DC-DC converter of a first datacenter building of the datacenter campus and a second end connected to a secondary DC-DC converter of second datacenter building of the datacenter campus, wherein the third DC superconductor cable is configured to distribute power between substations of the first and second datacenter buildings.

8. The system of claim 5, wherein each secondary DC-DC converter is configured to convert an incoming high voltage of about 100 kV or more to a medium voltage of between about 10-40 kV.

9. The system of claim 1, wherein at least one secondary DC superconductor cable connects the main DC-DC converter to an underground datacenter building.

10. The system of claim 1, wherein at least one datacenter building is connected to multiple secondary DC superconductor cables at different sides of the building.

11. The system of claim 10, wherein the different sides of the building are opposite sides of the building.

12. The system of claim 1, wherein the datacenter campus is a datacenter system configured to operate on between about 500 MVA and about 1,000 MVA.

13. The system of claim 1, further comprising a non-superconducting DC power line having a first end connected to the first AC-DC converter, and a second end connected to the second AC-DC converter, and configured to transfer power between the first AC power grid and the second AC power grid.

14. The system of claim 1, wherein each of the first and second AC-DC converters are outside of the datacenter campus, and wherein the DC-DC hub is within the datacenter campus.

15. The system of claim 1, wherein at least one of the first and second main DC superconductor cables is a high voltage superconductor cable, and wherein at least one of the plurality of secondary DC superconductor cables is a medium voltage superconductor cable.

16. The system of claim 1, wherein at least one the first and second main DC superconductor cables is a multicore superconductor cable, and wherein at least one of the plurality of secondary DC superconductor cables is a single core superconductor cable.

17. The system of claim 1, wherein the secondary DC superconductor cables have a diameter between 3"-6", and wherein the main DC superconductor cables have a diameter about twice to three times the size of the secondary DC superconductor cables.

18. A datacenter campus comprising:
a plurality of buildings, each building housing a plurality of server racks on one or more floors of the building;
a DC-DC hub connected to a first AC power grid via a first main DC superconductor cable and a first AC-DC converter, and to a second AC power grid via a second main DC superconductor cable and a second AC-DC converter; and
a plurality of secondary DC superconductor cables, wherein each secondary DC superconductor cable includes a first end electrically connected to the DC-DC hub and a second end electrically connected to the server racks of a respective datacenter building of the plurality of buildings.

19. The datacenter campus of claim 18, further comprising a plurality of substations, each substation associated with a corresponding building and housing a respective secondary DC-DC converter configured to receive electrical power at a first voltage from a respective secondary DC superconductor cable, reduce the received power from the first voltage to a second voltage, and transmit the received power at the second voltage to the server racks of the corresponding building via a respective third DC superconductor cable.

20. The datacenter campus of claim 18, further comprising a plurality of power supply units included in servers and computers of the server racks of the respective datacenter buildings, wherein the plurality of power supply units are configured to provide reactive power to first and second AC power grids through the DC-DC hub, and wherein the plurality of power supply units are configured to supply between 500 to 1500 VA of power to the first and second power grids through the DC-DC hub.

* * * * *